(12) United States Patent
Park

(10) Patent No.: US 6,394,928 B1
(45) Date of Patent: May 28, 2002

(54) AUTOMATIC TRANSMISSION POWERTRAIN

(75) Inventor: Jong-Sool Park, Suwon (KR)

(73) Assignee: Hyundai Motor Company (KR)

( * ) Notice: Subject to any disclaimer, the term of this patent is extended or adjusted under 35 U.S.C. 154(b) by 11 days.

(21) Appl. No.: 09/610,898

(22) Filed: Jul. 6, 2000

(30) Foreign Application Priority Data

Nov. 9, 1999 (KR) .................................. 99-49403

(51) Int. Cl.$^7$ .............................. F16H 3/44; F16H 57/10
(52) U.S. Cl. ...................... 475/271; 475/281; 475/283
(58) Field of Search ............................. 475/271, 276, 475/277, 279, 269, 280–286

(56) References Cited

U.S. PATENT DOCUMENTS

| | | | | |
|---|---|---|---|---|
| 4,226,123 A | * | 10/1980 | Croswhite | 74/688 |
| 5,232,418 A | * | 8/1993 | Aoki et al. | 475/271 |
| 5,250,011 A | * | 10/1993 | Pierce | 475/276 |
| 5,690,578 A | * | 11/1997 | Hall | 475/269 |
| 5,984,825 A | * | 11/1999 | Hebbale et al. | 475/286 |

* cited by examiner

Primary Examiner—Sherry Estremsky
Assistant Examiner—Tisha D. Lewis
(74) Attorney, Agent, or Firm—Finnegan, Henderson, Farabow, Garrett & Dunner, L.L.P.

(57) ABSTRACT

An automatic transmission powertrain includes a torque converter acting as a fluid link between an engine and a transmission, a primary shift portion provided on a first shaft, a long axis of which is aligned with a long axis of an input shaft, a secondary shift portion provided on a second shaft and connected to the primary shift portion via two power transmitting paths to transmit power to an output shaft of the powertrain, a power transmitting device for transmitting rotational power of the primary shift portion to the secondary shift portion, brakes for operating operational elements of the primary shift portion and the secondary shift portion as reaction elements, clutches for selectively transmitting power to operational elements of the primary shift portion, and a non-synchronous shifting device for operating during $1 \leftrightarrows 2$, $2 \leftrightarrows 3$ and $4 \leftrightarrows 2$ shifting.

12 Claims, 4 Drawing Sheets

FIG.2

| shift range | | C1 | C2 | C3 | B1 | B2 | B3 | F1 | F2 | ENGINE BRAKE |
|---|---|---|---|---|---|---|---|---|---|---|
| P | | | | | | | | | | |
| R | | | ● | | ● | | | | | |
| N | | | | | | | | | | |
| D | D1 | ● | | | | | | ▲ | | |
| | D2 | ● | | | | ● | | | ▲ | |
| | D3 | ● | ● | | | ● | | | | ○ |
| | D4 | ● | | ● | | ● | | | | ○ |
| OD OFF | D1 | ● | | | | | | ▲ | | |
| | D2 | ● | | | | ● | | | ▲ | |
| | D3 | ● | ● | | | ● | | | | ○ |
| 2 | D1 | ● | | | | | | ▲ | | |
| | D2 | ● | | | | ● | ● | | △ | ○ |
| L | D1 | ● | | | ● | | | | △ | ○ |

AUTOMATIC TRANSMISSION POWERTRAIN

BACKGROUND OF THE INVENTION (a) Field of the Invention

The present invention relates to an automatic transmission powertrain. More particularly, the present invention relates to an automatic transmission powertrain in which two single pinion planetary gearsets are combined in a simple manner to realize a primary shift portion and a secondary shift portion such that a length of the powertrain is minimized, and in which a one-way clutch is used for 1⇌2, 2⇌3 and 4⇌2 shifting, thereby greatly improving shift feel.

(b) Description of the Related Art

A transmission control unit included in the automatic transmission automatically controls a shift ratio according to changes in vehicle speed and load. A planetary gearset is used as a multi-stage gearshift mechanism in the transmission control unit.

The planetary gearset generally includes an input element for receiving engine torque; an output element for transmitting the engine torque to a final reduction gear after the torque has undergone shifting; and a reaction element for enabling the engine torque received by the input element to be transmitted to the output element after being shifted to a predetermined range. The output element is typically fixedly connected to the final reduction gear. However, since the input element is varied, the input element is connected to an element that transmits the engine torque with a friction element interposed therebetween. For the same reason, the reaction element is connected to a transmission housing with a friction element interposed therebetween.

A significant number of conventional automatic transmission powertrains such as described above have been disclosed. A powertrain can have a variety of different structures including a structure in which planet carriers are interconnected, a structure in which a common sun gear is used and a planet carrier and a ring gear are directly connected, a structure in which a planet carrier and a ring gear are directly connected, and many more.

SUMMARY OF THE INVENTION

It is an object of the present invention to provide an automatic transmission powertrain in which two planetary gearsets are combined in a simple manner to realize a primary shift portion and a secondary shift portion such that a length of the powertrain is minimized, and in which a one-way clutch is used for 1⇌2, 2⇌3 and 4⇌2 shifting, thereby greatly improving shift feel.

To achieve the above object, the present invention provides an automatic transmission powertrain comprising a torque converter acting as a fluid link between an engine and a transmission, the torque converter outputting rotational power to an input shaft of the powertrain; a primary shift portion provided on a first shaft, a long axis of which is aligned with a long axis of the input shaft, the primary shaft portion being selectively connected to the input shaft to receive rotational power; a secondary shift portion provided on a second shaft, the second shaft being parallel to the first shaft with a predetermined gap therebetween, and the secondary shift portion being connected to the primary shift portion via two power transmitting paths to transmit power to an output shaft of the powertrain; a power transmitting means for transmitting rotational power of the primary shift portion to the secondary shift portion; a brake means for operating operational elements of the primary shift portion and the secondary shift portion as reaction elements; a clutch means for selectively transmitting power to operational elements of the primary shift portion; and a non-synchronous shift means for operating during 1⇌2, 2⇌3 and 4⇌2 shifting. According to a feature of the present invention, the primary shift portion is a first planetary gearset, a ring gear and a sun gear which are selectively connected to the input shaft through the clutch means.

According to another feature of the present invention, the secondary shift portion is a second planetary gearset, a ring gear of which is fixedly connected to the output shaft.

According to yet another feature of the present invention, the power transmitting means comprises a first power transmitting gear connected to a planet carrier of the first planetary gearset; a second power transmitting gear meshed with the first power transmitting gear, and connected to the ring gear of the second planetary gearset and the output shaft; a third power transmitting gear provided on the first shaft and fixedly connected to the sun gear of the first planetary gearset; and a fourth power transmitting gear meshed with the third power transmitting gear, fixedly connected to a sun gear of the second planetary gearset, and provided on the second shaft.

According to still yet another feature of the present invention, the brake means comprises a first brake provided between the second shaft and a transmission housing; a second brake provided between the first shaft and the transmission housing with elements of the non-synchronous shift means being interposed between the second brake and the first shaft; and a third brake provided between the first shaft and the transmission housing.

According to still yet another feature of the present invention, the clutch means comprises a first clutch selectively connecting the ring gear of the first planetary gearset and the input shaft; a second clutch selectively connecting the sun gear of the first planetary gearset and the input shaft; and a third clutch selectively connecting a sun gear and a planet carrier of the second planetary gearset.

According to still yet another feature of the present invention, the non-synchronous shift means comprises a first one-way clutch interposed between the second shaft and the transmission housing, the first one-way clutch operating in a first speed to enable an element of the second planetary gearset to act as a reaction element; and a second one-way clutch interposed between the first shaft and the second brake, the second one-way clutch operating in a second speed to enable an element of the first planetary gearset to act as a reaction element during operation of the second brake.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 2 is an operational chart of friction elements in each shift range of the powertrain shown in FIG. 1;

DETAILED DESCRIPTION OF THE PREFERRED EMBODIMENTS

Preferred embodiments of the present invention will now be described in detail with reference to the accompanying drawings.

Figure 1:
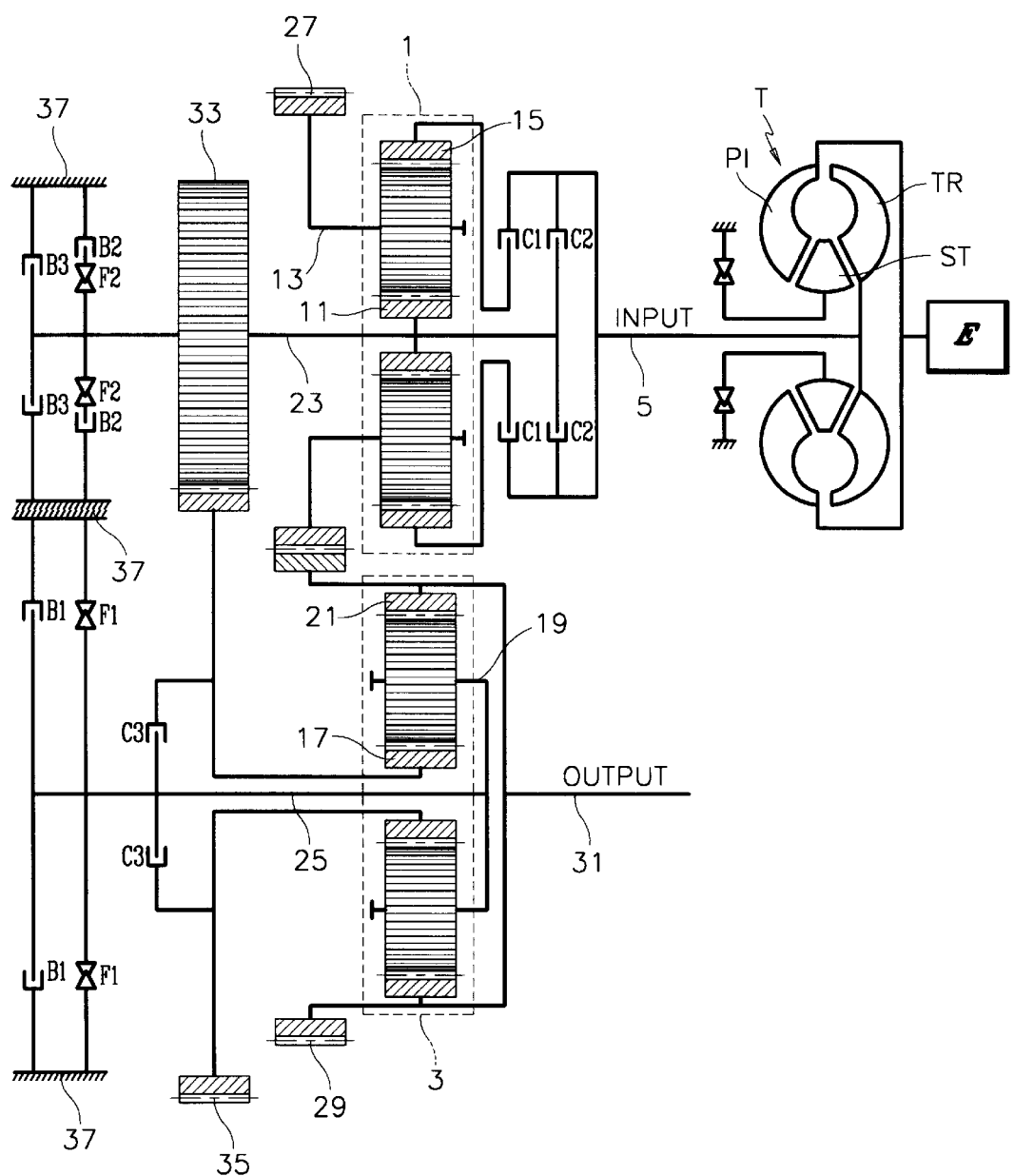
FIG. 1 is a schematic diagram of a powertrain according to a preferred embodiment of the present invention.

FIG. 1 shows a schematic diagram of a powertrain according to a preferred embodiment of the present invention.

Power generated by an engine E passes through a torque converter T, which acts as a fluid link between a crankshaft of the engine E and a transmission, and is transmitted to primary and secondary shift portions realized through first and second planetary gearsets 1 and 3, respectively. The torque converter T includes a pump impeller PI directly linked to the crankshaft of the engine E to rotate with the crankshaft; a turbine runner TR provided opposing the pump impeller PI and rotating as a result of a fluid (e.g., oil) expelled from the pump impeller PI; and a stator ST disposed between the pump impeller PI and the turbine runner TR, the stator ST changing a flow direction of the fluid to increase a rotational force of the pump impeller PI.

Accordingly, when the engine E operates, the pump impeller PI begins to rotate such that the fluid in the torque converter T is expelled from the pump impeller PI and supplied to the turbine runner TR to drive the turbine runner TR. The fluid then flows to the stator ST which changes the flow direction of the fluid and supplies it back to the pump impeller PI. With such operation, the torque converter T acts as a torque multiplier.

The first planetary gearset 1, which receives power from the torque converter T, is provided on a first shaft 23, the first shaft 23 being on an identical axis as an input shaft 5 (i.e., aligned with the input shaft 5). The second planetary gearset 3 is provided on a second shaft 25, the second shaft 25 being spaced at a predetermined interval from and parallel to the first shaft 23. The first and second planetary gearsets 1 and 3, acting respectively as primary and secondary shift portions as described above, are interconnected as will be described below.

The first planetary gearset 1 is mounted on the first shaft 23 through a sun gear 11. The second planetary gearset 3 is mounted on the second shaft 25 through a planet carrier 19, parallel to the first planetary gearset 1, and at a predetermined distance from the same. The first and second planetary gearsets 1 and 3 are interconnected by a separate power transmitting means.

The aforementioned power transmitting means includes (a) a first power transmitting gear 27 fixedly connected to a planet carrier 13 of the first planetary gearset 1 such that the first power transmitting gear 27 is able to rotate on the first shaft 23, and (b) a second power transmitting gear 29 fixedly connected to both a ring gear 21 of the second planetary gearset 3 and an output shaft 31 such that the second power transmitting gear 29 is able to rotate on the second shaft 25. The first power transmitting gear 27 is meshed with the second power transmitting gear 29.

Further, a third power transmitting gear 33, which is fixedly connected to the sun gear 11 of the first planetary gearset 1 through the first shaft 23, is meshed with a fourth power transmitting gear 35, the fourth power transmitting gear 35 being fixedly connected to a sun gear 17 of the second planetary gearset 3 such that the fourth power transmitting gear 35 is able to rotate on the second shaft 25.

The first and second planetary gearsets 1 and 3 interconnected as described above are provided respectively on the input shaft 5 and the output shaft 31, and on the first shaft 23 and the second shaft 25, in such a manner that the rotation of the first planetary gearset 1 does not interfere with that of the second planetary gearset 3. The first and second planetary gearsets 1 and 3 are also connected to brakes, clutches and non-synchronous shift means.

In more detail, a ring gear 15 of the first planetary gearset 1 is connected to the input shaft 5 with a first clutch C1 interposed therebetween. Also, one end of the sun gear 11 of the first planetary gearset 1 is connected to the input shaft 5 with a second clutch C2 interposed therebetween, and its other end is connected through the first shaft 23 to a transmission housing 37 with a second brake B2 and a second one-way clutch F2 interposed therebetween, and separately with a third brake B3 interposed therebetween. Here, the second one-way clutch F2 is provided between the second brake B2 and the first shaft 23.

The planet carrier 19 of the second planetary gearset 3 is connected to the transmission housing 37 through the second shaft 25 with a first brake B1 interposed therebetween, and separately to the transmission housing 37 through the second shaft 25 with a first one-way clutch F1 interposed therebetween. By the connection to the transmission housing 37 via the first one-way clutch F1, the planet carrier 19 still operates with a reverse rotation of the second shaft 25. Further, the planet carrier 19 of the second planetary gearset 3 is connected through the second shaft 25 to the sun gear 17 of the second planetary gearset 3 with a third clutch C3 interposed therebetween. Accordingly, the second planetary gearset 3 operates as an integral device.

In the above, it is possible to use a conventional multi-plate clutch for the first, second and third clutches C1, C2 and C3; and a conventional disc brake for the first and second brakes B1 and B2. In addition, with the realization of shifting by the selective operation of the elements of the first and second planetary gearsets 1 and 3, the ring gear 21 of the second planetary gearset 3 is connected to the output shaft 31 such that output is realized through a drive gear (not shown).

Shifting is realized by the selective operation of the friction elements in the powertrain of the present invention as shown in the chart of FIG. 2. Together with the lever analogy of FIG. 3, the shifting operation of the present invention will be described in more detail hereinbelow.

Figure 3:
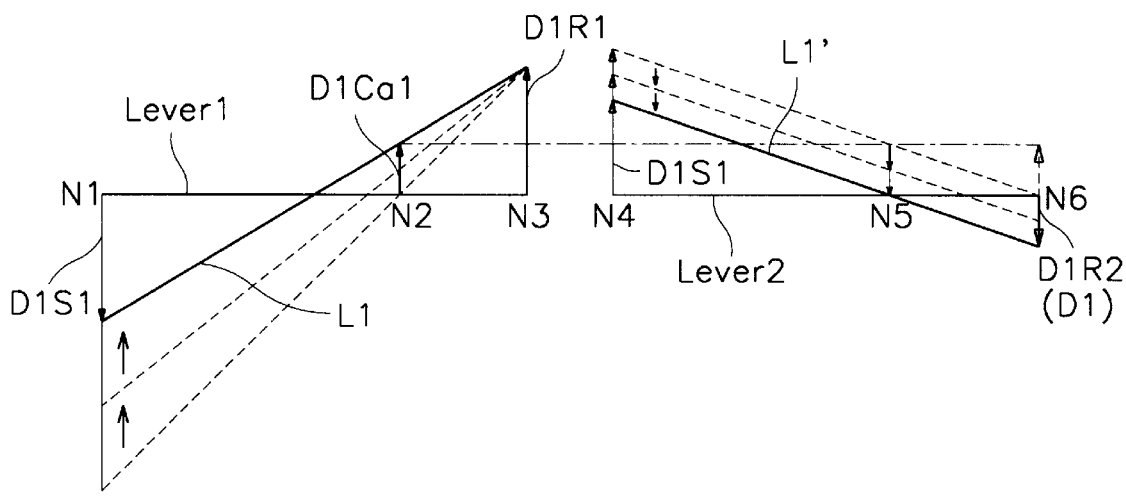
FIG. 3 is a lever analogy used to describe the operation of the powertrain of FIG. 2 in a first speed of a drive D range.

In FIG. 3, a first node N1 of a first lever Lever1 represents the sun gear 11 of the first single pinion planetary gearset 1, a second node N2 of the first lever Lever1 represents the planet carrier 13 of the first planetary gearset 1, and a third node N3 of the first lever Lever1 represents the ring gear 15 of the first planetary gearset 1. Also, a fourth node N4 of a second lever Lever2 represents the sun gear 17 of the second planetary gearset 3, a fifth node N5 of the second lever Lever2 represents the planet carrier 19 of the second planetary gearset 3, and a sixth node N5 of the second lever Lever2 represents the ring gear 21 of the second planetary gearset 3.

The elements represented by the nodes are determined by the combination of the planetary gearsets. Since this is well known in the art, a detailed description thereof will be omitted.

In a first speed of a drive D range, the first clutch C1 is engaged. Accordingly, the rotation of the input shaft 5, which receives power from the engine E, is transmitted to the ring gear 15 of the first planetary gearset 1 such that the ring gear 15 acts as an input element. In this first speed operation, the planet carrier 13 of the first planetary gearset 1 is connected to deliver output to the road surface through the first and second power transmission gears 27 and 29 and through the ring gear 21 of the second planetary gearset 3. In this state, the planet carrier 13 of the first planetary gearset 1 operates as a reaction element until the vehicle begins its forward motion. Immediately upon the inception of forward motion, however, a rotational direction of the planet carrier 13 as well as of the sun gear 11 of the first planetary gearset 1 is determined such that the planet carrier 13 rotates in a forward direction while the sun gear 11 rotates in a reverse direction.

Simultaneously with the above, the sun gear 17 of the second planetary gearset 3 receives rotational power from the third power transmitting gear 33 after the rotational power is reduced through the fourth power transmitting gear 35. Here, the third power transmitting gear 33 is connected to the ring gear 15 of the first planetary gearset 1 through the sun gear 11 of the first planetary gearset 1 and the first shaft 23.

In the above, the planet carrier 19 of the second planetary gearset 3 attempts to rotate in the reverse direction as a result of a rotational ratio of the sun gear 17 and the ring gear 21 of the second planetary gearset 3. However, by the engagement of the one-way clutch F1 (and the connection of the planet carrier 19 to the one-way clutch F1 through the second shaft 25), the rotation of the planet carrier 19 is repressed such that the planet carrier 19 operates as a reaction element.

Therefore, the ring gear 15 of the first planetary gearset 1 becomes an input element, and the planet carrier 19 of the second planetary gearset 3 acts as a reaction element, thereby realizing shifting into the first speed of the drive D range. Further, output is realized through the ring gear 21 of the second planetary gearset 3.

The above shifting operation into the first speed of the drive D range will be described with reference to FIG. 3. By a first input speed line D1R1 input to the third node N3 of the first lever Lever1, and a straight line L1 extended from a reaction point selected between the first and second nodes N1 and N2 of the first lever Lever1, first and second output speed lines D1S1 and D1Ca1, output respectively through the first and second nodes N1 and N2 of the first lever Lever1, are determined.

The first and second output speed lines D1S1 and D1Ca1 are formed not only by the operation of the first planetary gearset 1, but are related also to the operation elements of the second planetary gearset 3. This is realized by linkages through the first, second, third and fourth power transmitting gears 27, 29, 33 and 35. In more detail, the first output speed line D1S1 is reduced through the third and fourth power transmitting gears 33 and 35, and transmitted to the fourth node N4 of the second lever Lever2, similar to a second input speed line D1S2.

Occurring simultaneously with the above, at the moment when the first one-way clutch F1 is engaged, as with a line L1' which is connected to and operating the fifth node N5 as a reaction element, the sixth node N6 is connected to the second output speed line D1Ca1 extending from the second node N2 of the first lever Lever1. That is, input is realized through the ring gear 15 of the first planetary gearset 1, and with the planet carrier 19 of the second planetary gearset 3 acting as a reaction element, a first speed output speed line D1 like that of a third output speed line D1R2 of the second lever Lever2, which is output through the ring gear 21 of the second planetary gearset 3, is realized.

As can be known from the above, reduction to a first speed shift ratio resulting in a substantially smaller output rpm than input rpm is realized.

In the first speed state, if vehicle speed and throttle opening are increased, a transmission control unit (TCU) performs control to engage the second brake B2. With the engagement of the second brake B2 while in the first speed state, the second one-way clutch F2 is engaged such that the sun gear 11 of the first planetary gearset 1 operates as a reaction element. Accordingly, the sun gear 17 of the second planetary gearset 3 also operates as a reaction element such that the rotational force generated from the planet carrier 13 of the first planetary gearset 1 is transmitted directly to the output shaft 31 by the first and second power transmitting gears 27 and 29, thereby realizing shifting into a second speed of the drive D range.

Figure 4:
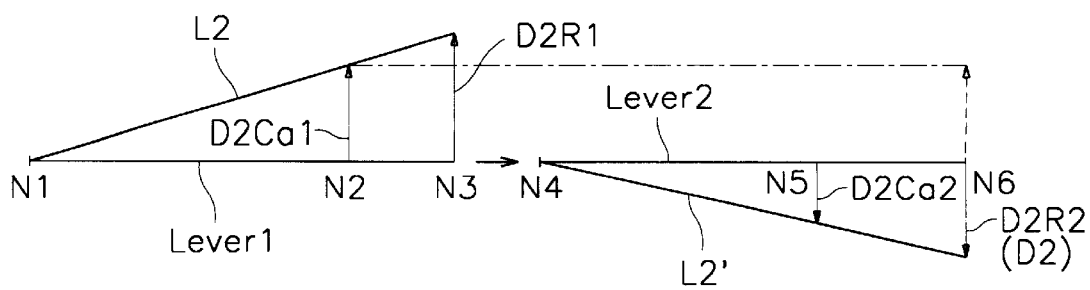
FIG. 4 is a lever analogy used to describe the operation of the powertrain of FIG. 2 in a second speed of the drive D range.

The above shifting operation into the second speed of the drive D range will be described with reference to FIG. 4. A line connecting the second node N2 of the first lever Lever1 to a line L2 that connects the first node N1, which operates as a reaction element, to a first input speed line D2R1 of the third node N3 of the first lever Lever1 becomes a first output speed line D2Ca1. The first output speed line D2Ca1 is transmitted directly as output rpm to the sixth node N6 of the second lever Lever2 to determine a second output speed line D2R2.

In more detail, input is realized through the ring gear 15 of the first planetary gearset 1, and with the sun gear 11 of the first planetary gearset 1 acting as a reaction element, a second speed output speed line D2 like that of the second output speed line D2R2 of the second lever Lever2, which is output through the ring gear 21 of the second planetary gearset 3, is realized. Accordingly, the second speed output line D2 has a greater output rpm than the first speed output line D1.

In the second speed state, if vehicle speed and throttle opening are increased, the TCU performs control to engage the second clutch C2. This results in a second input such that the powertrain now has a total of two input elements. Therefore, the first planetary gearset 1 is locked together and rotates as a unit, and rotational power is transmitted to the second planetary gearset 3 through the first, second, third and fourth power transmitting gears 27, 29, 33 and 35.

That is, rotational power is directly transmitted to the ring gear 21 of the second planetary gearset 3 through the first and second power transmitting gears 27 and 29, to be transmitted to the output shaft 31. Also, through the third and fourth power transmitting gears 33 and 35, the rotational power is reduced then transmitted to the sun gear 17 of the second planetary gearset 3. The difference in rotational speeds is absorbed by the planet carrier 19 of the second planetary gearset 3 rotating in reverse. Accordingly, shifting into a third speed of the drive D range is realized.

Figure 5:
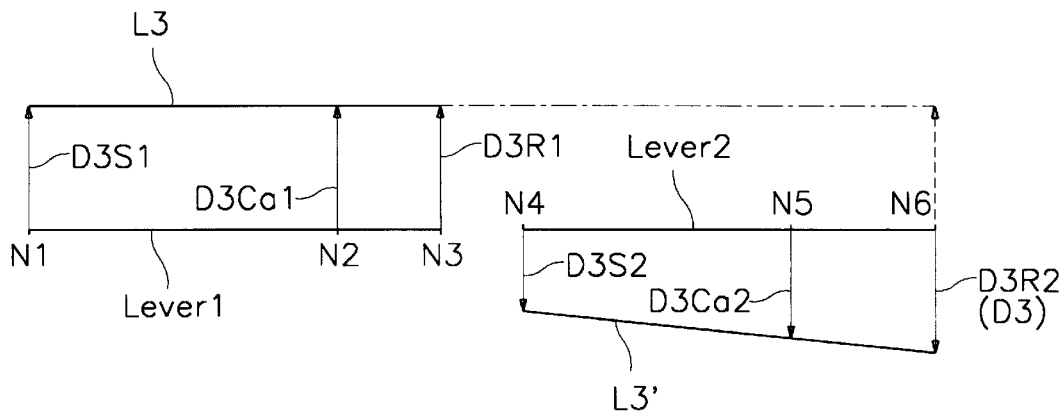
FIG. 5 is a lever analogy used to describe the operation of the powertrain of FIG. 2 in a third speed of the drive D range.

The above shifting operation into the third speed of the drive D range will now be described with reference to FIG. 5. A line connecting the second node N2 to a line L3, which connects a first input line D3S1 input to the first node N1 of the first lever Lever1 to a second input line D3R1 of the third node N3 of the first lever Lever1, becomes a first output speed line D3Ca1. The first output speed line D3Ca1 is transmitted to the sixth node N6 of the second lever Lever2 through the first and second power transmitting gears 27 and 29 to determine a second output speed line D3R2.

At this time, a difference in rotation between the rotational power reduced and transmitted to the sun gear 17 of the second planetary gearset 3 through the third and fourth power transmitting gears 33 and 35 and the rotational power directly transmitted to the ring gear 21 of the second planetary gearset 3 is absorbed by the reverse rotation of the planet carrier 19 of the second planetary gearset 3. Accordingly, there results third and fourth output speed lines D3S2 and D3Ca2 respectively of the fourth and fifth nodes N4 and N5 of the second lever Lever2, the third and fourth output speed lines D3S2 and D3Ca2 freewheeling.

That is, input is realized through the sun gear 11 and the ring gear 15 of the first planetary gearset 1, and the first planetary gearset 1 integrally rotates such that rotational power is output through the ring gear 21 of the second planetary gearset 3. As a result, an output speed line D3 like that of the second output speed line D3R2 of the second lever Lever2 is realized. Therefore, the output speed line D3 of the third speed of the drive D range is greater in rotational speed than the output speed line D2 of the second speed, with the output in the third speed being at an identical rotational speed as the input.

In the third speed state, if vehicle speed and throttle opening are increased, the TCU performs control to disengage the second clutch C2 and engage the third clutch C3. Accordingly, input through the sun gear 11 of the first planetary gearset 1 is discontinued, and the sun gear 17 and planet carrier 19 of the second planetary gearset 3 are integrally fixed. The second planetary gearset 3 operates as an external input element through the first, second, third and fourth power transmitting gears 27, 29, 33 and 35 such that rpm of the planet carrier 13, corresponding to the rpm of rotational power input through the ring gear 15 at a particular point, is determined, thereby realizing shifting into a fourth speed of the drive D range through the ring gear 21 of the second planetary gearset 3.

Figure 6:
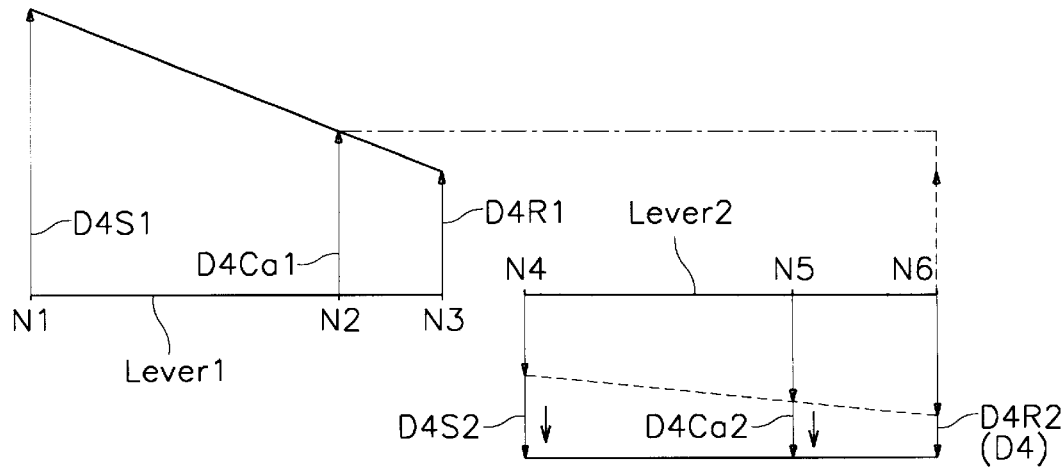
FIG. 6 is a lever analogy used to describe the operation of the powertrain of FIG. 2 in a fourth speed of the drive D range.

The shifting operation into the fourth speed of the drive D range will be described with reference to FIG. 6. By the second planetary gearset 3, corresponding to a first input speed line D4R1 input through the third node N3 of the first lever Lever1, a first output speed line D4S1 extending from the first node N1 is determined. Further, a line connecting the second node N2 to a line L4 extending from the first input speed line D4R1 becomes a second output speed line D4Ca1.

A third output speed line D4R2 of the second lever Lever2 is determined from the sixth node N6. Here, the third output speed line D4R2 is linked to the ring gear 21 of the second planetary gearset 3. In particular, overdrive is realized in which a faster output than that of the fourth speed of the drive D range results.

If the driver operates a shift select lever to a reverse R range, the second clutch C2 and the first brake B1 are engaged. Input is realized through the sun gear 11 of the first planetary gearset 1 by the operation of the second clutch C2, and the planet carrier 19 of the second planetary gearset 3 operates as a reaction element by the operation of the first brake B1, thereby realizing shifting into the reverse R range. In the reverse R range, output occurs through the ring gear 21 of the second planetary gearset as follows.

The input through the sun gear 11 of the first planetary gearset 3 is reduced through the sun gear 17 of the second planetary gearset 3 via the third and fourth power transmitting gears 33 and 35, and the second planetary gearset 3 operates such that the planet carrier 19 acts as a reaction element and output is realized through the ring gear 21.

Figure 7:
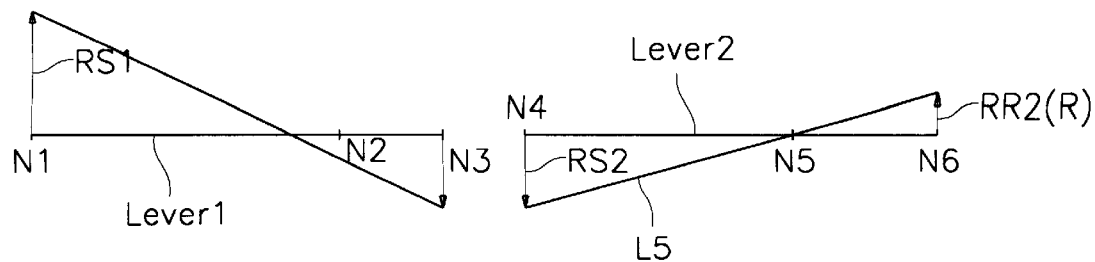
FIG. 7 is a lever analogy used to describe the operation of the powertrain of FIG. 2 in a reverse R range.

The above shifting operation into the reverse R range will now be described with reference to FIG. 7. A first input speed line RS1, input to the first node N1 of the first lever Lever1, is reduced at the fourth node N4 of the second lever Lever2 and transmitted to a second input speed line RS2. Also, a first output speed line RR2 extending from the sixth node of the second lever Lever2 is determined by a line L5, which extends using the fifth node N5 of the second lever Lever2 as a reaction element.

In the automatic transmission powertrain of the present invention, by combining in a simple manner two planetary gearsets to realize a primary shift portion and a secondary shift portion, the length of the powertrain is minimized and the overall structure is simplified. Also, with the use of a one-way clutch for $1 \leftrightarrows 2$, $2 \leftrightarrows 3$ and $4 \leftrightarrows 2$ shifting, shift feel is greatly improved.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. An automatic transmission powertrain comprising:
   a torque converter acting as a fluid link between an engine and a transmission, the torque converter outputting rotational power to an input shaft of the powertrain;
   a primary shift portion provided on a first shaft, a long axis of which is aligned with a long axis of the input shaft, the primary shift portion being selectively connected to the input shaft to receive rotational power;
   a secondary shift portion provided on a second shaft, the second shaft being parallel to the first shaft with a predetermined distance therebetween, and the secondary shift portion being connected to the primary shift portion via two power transmitting paths to transmit power to an output shaft of the powertrain;
   power transmitting means for transmitting rotational power of the primary shift portion to the secondary shift portion;
   brake means for operating operational elements of both the primary shift portion and the secondary shift portion as reaction elements;
   clutch means for selectively transmitting power to operational elements of the primary shift portion; and
   non-synchronous shift means for operating during $1 \leftrightarrows 2$, $2 \leftrightarrows 3$ and $4 \leftrightarrows 2$ shifting.

2. The automatic transmission powertrain of claim 1, wherein the primary shift portion is a first planetary gearset, a ring gear and a sun gear which are selectively connected to the input shaft through the clutch means.

3. The automatic transmission powertrain of claim 2 wherein the secondary shift portion is a second planetary gearset, a ring gear of which is fixedly connected to the output shaft.

4. The automatic transmission powertrain of claim 3 wherein the power transmitting means comprises:
   a first power transmitting gear connected to a planet carrier of the first planetary gearset;
   a second power transmitting gear meshed with the first power transmitting gear, and connected to the ring gear of the second planetary gearset and the output shaft;
   a third power transmitting gear provided on the first shaft and fixedly connected to the sun gear of the first planetary gearset; and a fourth power transmitting gear meshed with the third power transmitting gear, fixedly connected to a sun gear of the second planetary gearset, and provided on the second shaft.

5. The automatic transmission powertrain of claim 3 wherein the brake means comprises:
   a first brake provided between the second shaft and a transmission housing;
   a second brake provided between the first shaft and the transmission housing with elements of the non-synchronous shift means being interposed between the second brake and the first shaft; and
   a third brake provided between the first shaft and the transmission housing.

6. The automatic transmission powertrain of claim 3 wherein the clutch means comprises:
   a first clutch selectively connecting the ring gear of the first planetary gearset and the input shaft;
   a second clutch selectively connecting the sun gear of the first planetary gearset and the input shaft; and
   a third clutch selectively connecting a sun gear and a planet carrier of the second planetary gearset.

7. The automatic transmission powertrain of claim 1, wherein the non-synchronous shift means comprises:
   a first one-way clutch interposed between the second shaft and the transmission housing, the first one-way clutch operating in a first speed to enable an element of the second planetary gearset to act as a reaction element; and
   a second one-way clutch interposed between the first shaft and the second brake, the second one-way clutch operating in a second speed to enable an element of the first planetary gearset to act as a reaction element with the operation of the second brake.

8. An automatic transmission powertrain comprising:
   a torque converter acting as a fluid link between an engine and a transmission, the torque converter outputting rotational power to an input shaft of the powertrain;
   a first planetary gearset, a sun gear of which is provided on a first shaft, a long axis of the first shaft being aligned with a long axis of the input shaft;
   a second planetary gearset, a planet carrier of which is provided on a second shaft, the second shaft being parallel to the first shaft with a predetermined distance therebetween, and the second planetary gearset being connected to the first planetary gearset via two power transmitting paths to transmit power to an output shaft of the powertrain;
   power transmitting means for transmitting rotational power of the first planetary gearset to the second planetary gearset through the two power transmitting paths;
   brake means for operating operational elements of the first compound planetary gearset and the second planetary gearset as reaction elements;
   clutch means for selectively transmitting power to operational elements of the first planetary gearset; and
   non-synchronous shift means for operating during 1⇌2, 2⇌3 and 4⇌2 shifting.

9. The automatic transmission powertrain of claim 8 wherein the power transmitting means comprises:
   a first power transmitting gear fixedly connected to a planet carrier of the first planetary gearset;
   a second power transmitting gear meshed with the first power transmitting gear, and connected to a ring gear of the second planetary gearset and the output shaft;
   a third power transmitting gear provided on the first shaft and fixedly connected to the sun gear of the first planetary gearset; and
   a fourth power transmitting gear meshed with the third power transmitting gear, fixedly connected to a sun gear of the second planetary gearset, and provided on the second shaft.

10. The automatic transmission powertrain of claim 8 wherein the brake means comprises:
    a first brake provided between the planet carrier of the second planetary gearset and a transmission housing via the second shaft;
    a second brake provided between the sun gear of the first planetary gearset and the transmission housing via the first shaft, with elements of the non-synchronous shift means being interposed between the second brake and the first shaft; and
    a third brake provided between the sun gear of the first planetary gearset and the transmission housing via the first shaft.

11. The automatic transmission powertrain of claim 8 wherein the clutch means comprises:
    a first clutch selectively connecting a ring gear of the first planetary gearset and the input shaft;
    a second clutch selectively connecting the sun gear of the first planetary gearset and the input shaft; and
    a third clutch selectively connecting a sun gear and the planet carrier of the second planetary gearset.

12. The automatic transmission powertrain of claim 8, wherein the non-synchronous shift means comprises:
    a first one-way clutch interposed between the second shaft and the transmission housing, the first one-way clutch operating in a first speed to enable an element of the second planetary gearset to act as a reaction element; and
    a second one-way clutch interposed between the first shaft and the second brake, the second one-way clutch operating in a second speed to enable an element of the first planetary gearset to act as a reaction element with the operation of the second brake.

* * * * *